INVENTOR.
EVERETT C. SHUMAN
BY
ATTORNEYS

United States Patent Office 3,151,633
Patented Oct. 6, 1964

3,151,633
SHAPED THERMAL INSULATION FOR PIPE
Everett C. Shuman, New York, N.Y., assignor to Owens-Corning Fiberglas Corporation, a corporation of Delaware
Filed Mar. 29, 1961, Ser. No. 99,172
3 Claims. (Cl. 138—177)

The present invention relates to pipe insulation and more particularly to pre-formed or shaped thermal insulation for multiple pipe installations, such as traced pipe installations wherein a plurality of abutting pipes of widely variant sizes are to be insulated.

In some pipe installations, traced lines are utilized wherein superimposed pipes of widely differing sizes must be insulated from ambient conditions. Perhaps the most common example of such a pipe installation is in the utilization of a pipe of four inch diameter or the like having therebeneath a one-half inch to one inch steam pipe for heating the upper pipe to prevent condensation or solidification of material flowing through the upper pipe. Many other such examples may be cited, e.g. wherein electric cable heating tracers, or pipe for the flow of hot water, hot oil, or other heat exchange fluids are utilized. The common manner of insulating such traced lines is by the utilization of two, identical half-round insulating sections having a composite internal diameter of sufficient size to encompass both the primary pipe and the trace pipe. Of course, there is a substantial gap between the exterior periphery of the pipe and the interior periphery of the insulation, and there is only a very restricted load bearing contact between the pipe and the insulation. As a result any attempt to support the pipes and surrounding insulation by exterior support saddles, suspension straps or the like contacting the insulation will allow the weight of the pipe to bear radially on the insulation in substantially line contact therewith, thus crushing the insulation. Further, the use of conventional peripheral bands for securing the insulation to the pipe may rupture the insulation.

Therefore, it becomes necessary to support the pipe directly by bars, clips, angles or the like, and such attachment elements must project through the insulation for support from an overhead beam or the like. Not only are such attaching elements expensive and the pipe and insulation installations expensive, but the attendant heat losses or heat gains because of heat flow through the insulation gaps accommodating passage of the pipe supports through the insulation largely defeats the purpose of the insulation.

The present invention now proposes a new and novel traced line insulation possessing definite advantages over the prior art installations previously discussed. More specifically, the present invention provides insulation which is in constant extended load bearing contact to both the main pipe and tracer pipe components so as to permit the utilization of suspension straps, lower support saddles or the like of conventional type in engagement only with the exterior of the insulation; which prevents the crushing of the insulation while at the same time eliminating the necessity for direct pipe-engaging supporting elements; which can be secured in generally semi-cylindrical, closely conforming sections to the pipe by conventional peripheral banding methods; which fits to both the primary pipe and the tracer pipe so as to withstand bumping, knocking and other rough treatment when installed; which accommodates the use of highly conductive cement to improve heat transfer from the tracer to the main pipe; and which maintains adequate insulation thicknesses at all portions of both the primary pipe and the tracer pipe.

Structurally, the insulation of the present invention includes a lower, load-bearing section which is generally semi-oval in shape and is provided with an inner surface having a recess receiving therein the tracer pipe. By properly dimensioning the depth of the recess relative to the radial or wall thickness of the insulation, adequate insulation may be maintained about the tracer while, at the same time, accommodating a sufficient departure from a true semi-cylindrical inner configuration to receive the tracer pipe therein. In the preferred embodiment of the invention, the insulation is of the pre-formed, molded type, as for example a low density calcium silicate, and the tracer-accommodating recess may be readily molded into the inner periphery of the pipe section. In the event that the material of which the insulation is formed is fiberglass, molded asbestos fiber, foamed organic and/or inorganic materials, or the like, the recess again can either be preformed during molding or may be routed, milled or cut at the interior periphery of the insulation section.

It is, therefore, an important object of the present invention to provide a new and novel pipe insulation for multiple pipe installations.

Another important object of the present invention is to provide preformed thermal insulation for traced pipe installations wherein the thermal insulation is provided with a recess at the interior periphery thereof of sufficient size to accommodate the tracer pipe while at the same time providing a thickness of insulation for the tracer pipe at least equal to that specified for the main pipe.

Still another object of this invention is to provide a preformed thermal insulation member for tracer pipe installations wherein the thermal insulation is provided with a recess on its interior periphery of size sufficient to accommodate the tracer pipe while at the same time maintaining the recess space sufficiently small to eliminate the danger from accumulation of explosive gases and also providing a maximum of bearing contact of the insulation material with the installed pipes.

It is a further object of this invention to provide an improved molded insulation for a plurality of abutting pipes of widely variant sizes wherein that portion of the larger pipe adjacent the smaller pipe and the smaller pipe are peripherally enclosed within molded insulation of non-semi-cylindrical shape and having a recess at the inner periphery thereof receiving the tracer pipe and in extended surface contact with both the pipes to accommodate the exterior support of the assembly by completely exterior support means contacting only the insulation.

Yet another important object of the present invention is the provision of molded insulation for a multiple pipe installation wherein abutting pipes of substantially different diameter are to be peripherally enclosed and including an insulation portion of semi-oval configuration having a substantially semi-cylindrical inner periphery abutting the larger of the pipes and an axially extending recess receiving the second of the pipes in load-bearing relation thereto, the portion of the insulation element surrounding the smaller of the pipes having a thickness at least as great as any other portions thereof.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
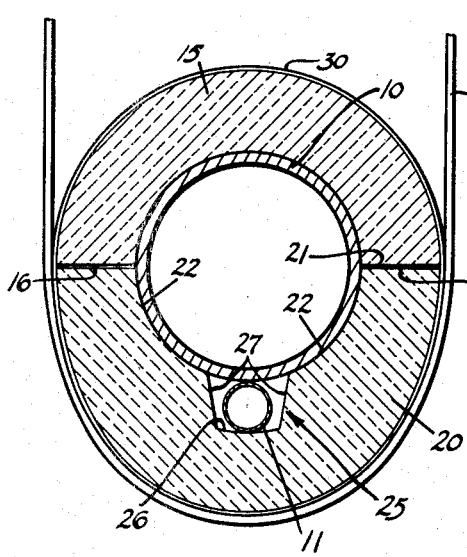
FIGURE 1 is a radial sectional view through a traced pipe installation of the present invention utilizing a single tracer pipe.

As shown on the drawings:

In FIGURE 1 reference numeral 10 refers generally to a pipe of cylindrical contour and having secured thereto and extending coextensively therewith a lower smaller diameter tracer line 11. A typical installation utilizing the pipes 10 and 11 of FIGURE 1 involves the flow of steam or other heat exchange fluid through the pipe 10 and the provision of the tracer pipe 11 therebeneath through which steam or other fluid at higher temperatures or even an electric heating cable is also passed to prevent condensation of the steam within the upper pipe 10. The two pipes 10 and 11 are in effective heat exchange relation, and it is necessary to thermally insulate both such pipes.

Inasmuch as the upper one-half of the pipe assembly 10, 11 (that portion of the pipe 10 not provided with the tracer line 11) is of true semi-cylindrical configuration, an upper molded insulation 15 of conventional, truly semi-cylindrical configuration and uniform wall thickness is applied thereto. Thus, if adequate insulation of the pipe 10 requires an insulation thickness of two inches, then the upper portion 15 of the insulation is of this required thickness and the radial, diametrically aligned terminal edges 21 of the insulation 15 also are two inches in width.

The lower portion of the pipe assembly 10, 11 because of the presence of the tracer line 11, is not truly cylindrical in configuration and it will be obviously impossible to apply thereto a semi-cylindrical section identical to the upper section 15 of the insulation. Consequently, the lower section 20 of insulation is of variant thickness, but of a minimum thickness corresponding to the thickness of the upper section 15 in order to insure adequate insulation. The diametrically aligned radial end surfaces 16 abutting the corresponding end surfaces 21 of the upper insulation section 15 are of a thickness identical with that of the upper section 15 to insure smoothly mating contact therebetween.

Substantial arcuate inner peripheral surfaces 22 of segmental, truly cylindrical contour are provided to either side of a recess or notch indicated generally at 25 and accommodating the tracer pipe 11. Preferably, the peripheral or bottom wall 26 of this recess 25 closely underlies the exterior periphery of the tracer pipe 11, while the side walls 27 flare upwardly and outwardly from the bottom wall 26 for juncture with the inner peripheral surface 22. The tapered recess 25 thus provided is of proper design to give sufficient draft for molding the recess 26 by means of a mold insert and also provides a wide entrance mouth for the recess 25 to facilitate assembly of the insulation section 20 onto the pipes 10 and 11.

If desired, the recess, externally of the lower pipe 11, accommodates the application of conductive cement to the tracer to convert the line tracer-to-main pipe contact to extended surface contact.

Considering now the overall contour of the insulation section 20, it will be seen that the inner periphery thereof is primarily cylindrical in configuration, i.e. at the portions 22, with the exception of the centrally located lower recess 25. The outer periphery of the section 20 is substantially semi-oval in cross-section, in order to provide a radial insulation dimension or thickness which is no less than the radial dimension of the joining edges 16, or the thickness of the upper section 15, despite the presence of the recess 25 which is of substantial radial extent, i.e. substantially the external diameter of the tracer pipe 11.

The semi-oval cross-section of the insulation element 20 gives an overall semi-ovate-cylindrical shape to the complete element, i.e. the shape is that of a semi-cylinder in which sections normal to the axis are oval or ellipsoidal. The major axis of the oval intersects the axes of both pipes 10 and 11 and intersects the geometric center of the recess 25; the minor axis intersects the free edges 16 of the element 20. Thus, the shape of the section 20 may be variously and accurately defined as "semi-oval" or "semi-ellipsoidal" in cross-section, having minor and major axes as described, and as being of solid semi-ovate-cylindrical shape.

Inasmuch as the recess bottom wall 26 closely underlies the undersurface of the steam pipe 11 and the remainder of the inner peripheral surfaces 22 snugly abut the pipe 10, it is possible to assemble the insulation sections 15 and 20 by conventional peripheral banding 30 and further to utilize conventional hangar straps 31 without the weight of the pipe and the insulation causing a collapse of the insulation. In other words, there is a load-bearing relation between substantially all of the exterior surface of the pipe 10 and the inner peripheries of the insulation sections 15 and 20, and there also is load-bearing relation between the bottom wall 26 of the insulation recess 25 and the lower surface of the tracer pipe 11. Of course, room must be left interiorly of the insulation, at the time of installation, for the expansion of the pipes 10 and 11 in use. Thus, the depth of the recess 25 will be somewhat greater than the diameter of the pipe 11. Under the circumstances, the peripherally applied, substantially radially acting loads imposed by the peripheral banding 30 securing the sections 15 and 20 together cannot collapse the insulation because it is supported against radial collapse by the pipes. Similarly, the weight of the pipe and the insulation is imposed on the hangar strap or saddle 31 by placing the insulation in substantially radial compression loading, which radial loads are easily borne by the insulation inasmuch as such loads are directly transmitted from the pipes 10 and 11 and the insulation section 20 to the hangar strap 31.

Figure 2:
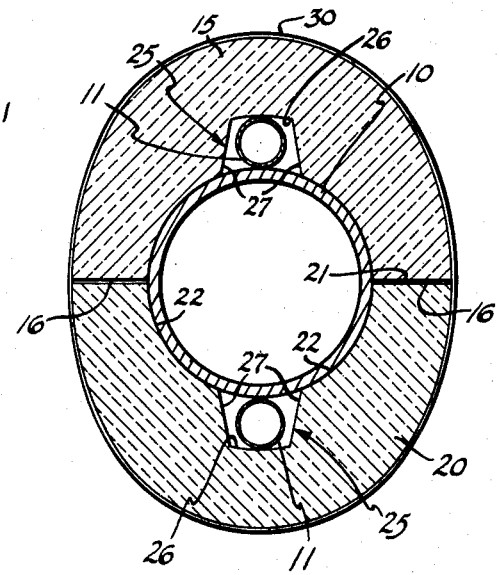
FIGURE 2 is a view similar to FIGURE 1 but illustrating the insulation of the present invention utilized with a dual tracer pipe arrangement.

In FIGURE 2 of the drawings, a different type of traced line insulation installation is illustrated wherein the larger pipe 10 is provided with upper and lower tracer lines 11. In each instance, it is necessary to accommodate the tracer lines without reduction in the overall thickness of the insulation. Accordingly, two identical lower sections 20 are utilized to replace the combined upper section 15 and lower section 20 of FIGURE 1. Alternatively, the configuration of FIGURE 2 may be turned 90°, so that the tracer lines 11 lie to either side of the main pipe. Even so, the same insulation structure of FIGURE 2 can be used.

Figure 3:
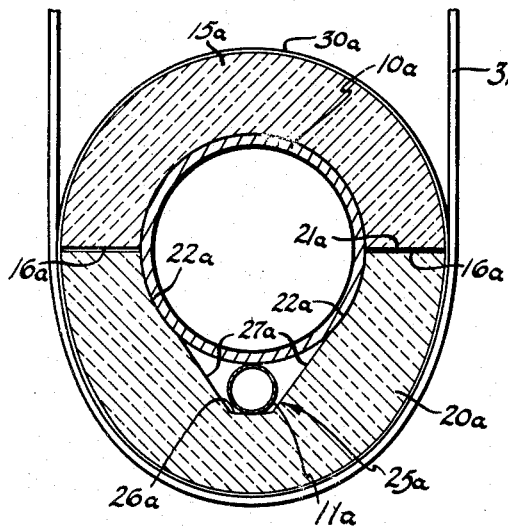
FIGURE 3 is a view similar to FIGURE 1 illustrating a modified form of the insulation of the present invention.
Figure 4:
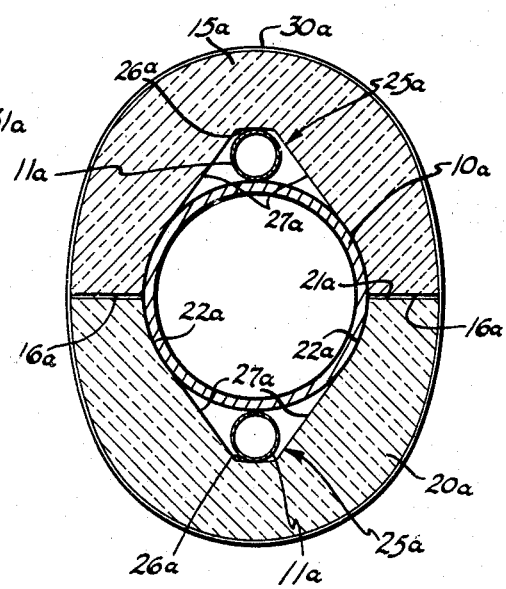
FIGURE 4 is a view similar to FIGURE 2 illustrating the utilization of the embodiment of FIGURE 3 in a multiple tracer installation.

In the modification of the invention illustrated in FIGURE 3 of the drawings, the recess 25a is substantially the same as the recess 25 heretofore described with the exception that the side walls 27a thereof slope upwardly and outwardly at a greater angle of divergence. In this manner, some insulating value is lost and there is somewhat less contact between the inner periphery of the lower pipe section 20a and the upper pipe 10, but the illustrated pipe and insulation assembly is still capable of supporting its own weight on the hangar straps 31a and is still capable of being assembled by means of the peripheral clamping straps 30a. Since this form of the invention includes a greater space in the zone about the tracer pipe, it is not the preferred form of the invention in those installations where danger of explosion from gaseous accumulations might arise. Under such circumstances, the embodiment of FIGURES 1 and 2 shaped with a minimal space about the tracer pipe is preferable.

From the foregoing, it will be obvious that the present invention provides insulation capable of utilization with traced pipe installations while accommodating the conventional assembly of the molded insulation upon both the primary pipe and the tracer pipe and yet maintain sufficient thermal insulation. The non-cylindrical contour of that portion of the insulation surrounding the tracer pipe and the extended load-bearing contact between the pipe assembly and the insulation makes possible the provision of sufficient insulation thickness without sacrificing strength or load-bearing capacity. Additionally, the space required to encompass a tracer pipe is considerably reduced over prior arrangements and danger from explosive gaseous accumulations are minimized or eliminated without the need for separate grouting or packing of such space.

It will be readily understood that the insulation configurations illustrated in the drawings are susceptible to utilization with many different insulating materials, including lightweight calcium silicates, such as synthetic tobermorite, synthetic xonotlite or the like, as well as moldable asbestos materials or even moldable fiberglass materials or foamed organic or inorganic materials or mixtures thereof. Further, the recesses 25 accommodating the tracer pipes may be formed during a conventional molding operation or, alternatively, may be routed, cut, or otherwise formed after the molding of the insulation with a true semi-cylindrical inner periphery and the above described semi-oval outer periphery. While the above discussion is concerned primarily with tracer lines to heat the main pipe, the principles herein set forth are equally applicable to cooling tracers containing heat exchange fluids to cool the main pipe.

I claim:

1. Insulation for enclosing a traced pipe assembly including a primary pipe and a substantially smaller tracer pipe coextensive with said primary pipe and in surface abutment therewith, comprising a first insulation section contacting the primary pipe, said first section having substantially horizontal free edges, and a second insulation section having free edges contacting the corresponding edges of the first section and having spaced internal arcuate surfaces of segmental cylindrical contour to each side, respectively, of a recess having a depth corresponding substantially to the external diameter of the tracer pipe, each of said sections having a minimum thickness at least as great as the thickness of the first section free edges.

2. Insulation as defined in claim 1 wherein a single lower tracer pipe is utilized and the first insulation section contacts only the primary pipe, said first section being substantially semi-cylindrical in configuration and of substantially constant wall thickness.

3. Insulation as defined in claim 1 wherein the primary pipe is in surface abutment with upper and lower tracer pipes and the first and second insulation sections are substantially identical and are inverted relative to one another for abutment at substantially horizontal free edges.

References Cited in the file of this patent

UNITED STATES PATENTS

| | | |
|---|---|---|
| 1,797,443 | Powell | Aug. 24, 1928 |
| 2,773,513 | Isenberg | Dec. 22, 1953 |
| 2,857,931 | Lawton | Mar. 24, 1955 |